(12) United States Patent
Slivka et al.

(10) Patent No.: US 6,192,432 B1
(45) Date of Patent: Feb. 20, 2001

(54) CACHING UNCOMPRESSED DATA ON A COMPRESSED DRIVE

(75) Inventors: Benjamin W. Slivka, Clyde Hill; Forrest Foltz, Woodinville, both of WA (US)

(73) Assignee: Microsoft Corporation, Redmond, WA (US)

(*) Notice: Under 35 U.S.C. 154(b), the term of this patent shall be extended for 0 days.

(21) Appl. No.: 09/286,276

(22) Filed: Apr. 5, 1999

Related U.S. Application Data

(63) Continuation of application No. 08/735,968, filed on Oct. 23, 1996, which is a continuation of application No. 08/266,180, filed on Jun. 27, 1994, now abandoned.

(51) Int. Cl.[7] .................................................. G06F 11/20
(52) U.S. Cl. ........................... 710/68; 711/154; 710/57
(58) Field of Search ............................ 382/173, 254, 382/276, 252; 711/100, 101, 111, 113, 114, 118, 130, 135, 154, 140; 710/68, 56, 57, 21, 20, 1; 709/200; 712/1, 32

(56) References Cited

U.S. PATENT DOCUMENTS

| | | | |
|---|---|---|---|
| 4,467,421 | 8/1984 | White | 364/200 |
| 4,476,526 | 10/1984 | Dodd | 364/200 |
| 4,780,808 | 10/1988 | Moreno et al. | 364/200 |
| 5,124,987 | 6/1992 | Milligan et al. | 371/10.1 |
| 5,247,638 | 9/1993 | O'Brien et al. | 395/425 |
| 5,265,252 | 11/1993 | Rawson, III et al. | 395/700 |
| 5,280,600 | 1/1994 | Van Maren et al. | 395/425 |
| 5,281,967 | 1/1994 | Jung | 341/55 |
| 5,291,585 | 3/1994 | Sato et al. | 395/500 |
| 5,298,895 | 3/1994 | Van Maren | 341/51 |
| 5,305,295 | 4/1994 | Chu | 369/30 |
| 5,394,534 | 2/1995 | Kulakowski et al. | 395/425 |
| 5,408,542 | 4/1995 | Callahan | 382/56 |
| 5,410,671 | 4/1995 | Elgamal et al. | 395/425 |
| 5,414,850 | 5/1995 | Whiting | 395/700 |
| 5,450,599 | 9/1995 | Horvath et al. | 395/800 |
| 5,463,772 | 10/1995 | Thompson et al. | 395/600 |
| 5,471,632 | 11/1995 | Gavin et al. | 395/284 |
| 5,479,210 | 12/1995 | Cawley et al. | 348/390 |
| 5,486,826 | 1/1996 | Remillard | 341/51 |
| 5,490,260 | 2/1996 | Miller et al. | 395/427 |
| 5,506,580 | 4/1996 | Whiting et al. | 341/51 |
| 5,574,952 | * 11/1996 | Brady et al. | 710/68 |
| 5,694,619 | * 12/1997 | Konno | 710/68 |

OTHER PUBLICATIONS

Gibson, Steve, "Avoid DOS 6.0 Data Loss With Smart-Prompt Or Other TSRs," *InfoWorld*, May 31,1993, p. 39.
Johnston, Stuart J., "Corporate Users Wary of DOS 6.0," *InfoWorld* 15(18):1,88, 1993.
Livingston, Brian, "DoubleSpace Can Create Headaches For Windows Users," *InfoWorld*, Jun. 7, 1993, p. 27.
Microsoft Corp., MS DOS 5.0 User's Guide & Reference, Microsoft Corp., Redmond, WA, 1991, p. 433.
Novell, Inc., *DR DOS 6.0 User Guide*, Novell, Inc., Provo, UT, 1993, pp. 471–479.
Novell, Inc., *Netware 4.0 Getting Started with Netware 4.0*, Novell, Inc., Provo, UT, 1993, pp. i–vii, 5–6.
Novell, Inc., *Netware 4.0 Installation and Upgrade*, Novell, Inc., Provo, UT, 1993, pp. i–vii, 39–40.
Silvka, Benjamin W. et al., "Inside MS–DOS 6," *BYTE*, Jul. 1993, pp. 197–200,202.
Strehlo, Kevin et al., "Tracking The Wily DOS 6 Bugs Has Been An Adventure," *Infoworld* 15(18):88, 1993.

* cited by examiner

*Primary Examiner*—Larry D. Donaghue
(74) *Attorney, Agent, or Firm*—Joseph R. Kelly; Westman, Champlin & Kelly, P.A.

(57) ABSTRACT

An improved compressed file system is provided. In a preferred embodiment of the present invention, a memory cache is used for storing uncompressed data that is sent to or received from a compressed logical drive. When writing data to the compressed logical drive, the preferred embodiment of the present invention determines whether to use write-behind caching or write-through caching.

9 Claims, 9 Drawing Sheets

CACHING UNCOMPRESSED DATA ON A COMPRESSED DRIVE

CROSS-REFERENCE TO RELATED APPLICATION

This application is a continuation of U.S. patent application Ser. No. 08/735,968, filed Oct. 23, 1996, which is a continuation of U.S. patent application Ser. No. 08/266,180, filed Jun. 27, 1994, now abandoned.

TECHNICAL FIELD

The present invention relates generally to data processing systems and, more particularly, to the caching of data in a compressed file system.

BACKGROUND OF THE INVENTION

Data compression is well known in the computer industry. Data compression refers to various means of reducing the storage requirements needed to store information. File systems have used data compression to increase the effective storage capacity of storage devices (e.g., drives) by storing compressed data on a compressed drive. File systems decompress the compressed data before providing the data to a calling program. When a calling program wishes to store data on a compressed drive, the calling program invokes the compressed file system (usually through an operating system), which compresses the data and stores the compressed data on the compressed drive.

File systems typically implement a compressed drive as a logical drive within an uncompressed drive. FIG. 1 shows a sample prior system for using an uncompressed drive as a compressed drive. The uncompressed drive 100 has four uncompressed files 110, 112, 114, 116 and a compressed logical drive 102. The compressed logical drive 102 contains three compressed files, 104, 106, 108. The compressed logical drive 102 appears to the uncompressed drive 100 as merely another file. However, the compressed file system treats the compressed logical drive 102 as if the compressed logical drive 102 were a physically separate drive. Therefore, a compressed logical drive 102 is a portion of an uncompressed drive 100 that is used in a different manner.

FIG. 2 depicts a typical layout for a compressed logical drive. The compressed logical drive 102 has a Basic Input/Output System Parameter Block (BPB) 202, a Bit File Allocation Table (BitFAT) 204, a Compressed File Allocation Table (CFAT) 206, a File Allocation Table (FAT) 208, a root directory 210, and a sector heap 212. The BPB 202, contains the length of the compressed logical drive 102 as well as general information about the drive, such as the number of sectors on the drive, the number of sectors per cluster, and the maximum number of entries in the root directory. The BitFAT 204 contains a bitmap which indicates whether each individual sector in the sector heap 212 is available or in use. The CFAT 206 is a table that maps uncompressed data (in the form of clusters) onto compressed data in the sector heap 212. A cluster is the unit of allocation for a file system and is defined as a multiple (usually a power of two) of sectors. A sector is a physical portion of the drive that is accessed as a unit (e.g., 512 bytes). The FAT 208 is a table that contains an entry for each cluster of uncompressed data and links together the clusters that are allocated to a file or a directory. Typically, file systems are organized in a hierarchical fashion with directories and files. Directories can contain both files and other directories and one directory at the top of the hierarchy is known as the root directory. The root directory 210 contains the file names and subdirectory names of all the files and subdirectories in the root directory of the compressed logical drive 102. The sector heap 212 contains the sectors in the compressed logical drive 102 where the compressed data is stored.

FIG. 3 is a block diagram of the components of a compressed file system. The compressed file system contains a compressed logical drive 102 and a memory 302. The compressed logical drive 102 contains a root directory 210, a FAT 208, a CFAT 206, and a sector heap 212. The root directory 210 contains an entry 304 for each file or directory in the root directory of the compressed file system. The FAT 208 contains an entry for each cluster of the compressed logical drive 102. Each entry in the FAT 208 refers to the next cluster in a chain of clusters. Each chain of clusters represents a file or a directory on the compressed logical drive 102. For each entry in the FAT 208, there is a corresponding entry in the CFAT 206. The CFAT 206 maps a cluster from the FAT 208 onto the actual sectors in the sector heap 212 that contain the compressed data for that cluster. In addition, the CFAT 206 maintains a count of the number of sectors in the sector heap 212 that are used for storing each cluster. The sector heap 212 contains the actual sectors of the compressed logical drive 102 that contain data. The memory 302 contains a calling program 308, an operating system 310 and a compression/decompression component 306. The calling program 308 can be any computer program wishing to access a file on the compressed logical drive 102. The operating system 310 is a computer program responsible for managing the files on the compressed logical drive 102. The compression/decompression component 306 is responsible for compressing data and decompressing data. The compression/decompression component 306 can be any of a number of well-known compression techniques.

The following illustrates access to the compressed data when a calling program 308 invokes the operating system 310 to read data from the compressed logical drive 102. The calling program 308 passes the file name of the desired file to the operating system 310. The operating system 310 finds the entry for the desired file in the root directory 210. The entry 304 in the root directory 210 contains the file name and the cluster number of the first cluster of data stored in the file ("first data cluster number"). In the root directory entry 304, the data cluster number for the file is cluster 54. After receiving the first data cluster number, the operating system 310 determines the file cluster ordinal. That is, the operating system 310 determines which cluster, in relation to the file (e.g., first, second, third, etc.), contains the requested data. The number of this cluster in relation to the file, is the file cluster ordinal Then, the operating system 310 accesses the FAT 208 with the first data cluster number and the file cluster ordinal and accesses the FAT entries to locate the cluster in which the requested data is contained. Therefore, the number of entries accessed in the FAT 208 is equal to the file cluster ordinal. For example, if the data requested is contained in the second cluster of the file, the file cluster ordinal would be equal to two. In order to access the data in the second cluster, the operating system 310 examines the FAT 208 entry for the first cluster of the file to determine the FAT entry for the second cluster for the file. In this example, entry 54 of the FAT 208 refers the operating system 310 to entry 55 of the FAT 208. The operating system 310 then accesses the corresponding CFAT 206 entry to determine the actual sector or sectors in the sector heap 212 that contain the compressed data. In this example, the CFAT 206 entry 55 refers the operating system 310 to sector 275 of the sector heap 212. However, before the calling program 308 can use the data contained in sector 275 of the sector heap 212, the operating system 310 uncompresses the data using the compression/decompression component 306. Calling programs in a compressed file system typically use data in an uncompressed form.

Prior uncompressed file systems use a FAT and store clusters of data onto the drive as clusters. That is, uncompressed file systems do not store data on a sector-by-sector basis, uncompressed file systems store data on a cluster-by-cluster basis. Instead of developing a completely new compressed file system, the developers of some compressed file systems modified existing uncompressed file systems. The developers modified existing uncompressed file systems so that programs that used the uncompressed file systems would not have to change to take advantage of the newly developed compressed file systems. As such, the developers of one compressed file system kept the structure of the uncompressed file system (i.e., the FAT) and added structures to map data stored on a cluster-by-cluster basis to compressed data stored on a sector-by-sector basis (i.e., the CFAT and BitFAT).

Although compressed file systems increase the effective storage capacity of uncompressed drives, when storing data to a compressed logical drive, compressed file systems incur significant overhead due to the invocation of the compression/decompression component. In addition, the compressed file system, like uncompressed file systems, incurs overhead waiting for the physical storage of the data (i.e., the write operation) onto the compressed logical drive. The performance of compressed file systems has been increased by introducing a memory disk cache into the compressed file system. A memory disk cache is computer memory that is used to store disk data that is frequently accessed to reduce the number of times that the drive must be used in order to either read or write data. A memory disk cache stores data in terms of cache blocks. Cache blocks are defined in terms of the number of clusters of data that one cache block can store. Typically, a cache block can store four clusters of data. Using a memory disk cache (hereafter "memory cache") is preferred over physical drive access because accessing memory is significantly faster than accessing a drive.

FIG. 4 is a block diagram of a compressed file system which uses a memory cache. The memory 302 has a calling program 308, a memory cache 402, an operating system 404, and a compression/decompression component 306. The memory cache 402 is used to store frequently used data in order to reduce the number of times that the compressed logical drive 102 is used. For example, a memory cache may store the data for one or more files, or the data for portions of one or more files. The operating system 404 uses a caching algorithm to determine which data is stored in the memory cache 402, when the data is written out to the compressed logical drive 102, as well as when the data is read from the compressed logical drive 102 to the memory cache 402. Various caching algorithms are well-known in the computer industry. Although using the memory cache 402 reduces the number of times that the compressed logical drive 102 is physically accessed, the data stored in the memory cache is still in a compressed form. Therefore, when the calling program 308 invokes the operating system 310 to store data, the compression/decompression component 306 is used before the data is stored and the write completes. In addition, when the calling program 308 invokes the operating system 310 to read data from the memory cache 402, the operating system 310 decompresses the data by invoking the compression/decompression component 306 before the data is used by the calling program 308.

SUMMARY OF THE INVENTION

A preferred embodiment of the present invention provides for an improved compressed file system. A preferred embodiment comprises a memory cache, a first file allocation table, a second file allocation table, a compression component, and a storage component. The memory cache provides a means for storing uncompressed data that is read from or written to a compressed drive. The first file allocation table provides for mapping data contained in the memory cache onto uncompressed clusters. The second file allocation table provides for mapping uncompressed clusters onto compressed sectors. The compression component provides for compressing data into a compressed format and for decompressing data into an uncompressed format. The storage component provides for storing the compressed data into sectors.

DETAILED DESCRIPTION OF THE INVENTION

A preferred embodiment of the present invention provides an improved compressed file system. A preferred embodiment of the present invention is an improvement over the prior art by reducing the overhead for performing compressed logical drive accesses by using a memory cache. The memory cache of the preferred embodiment stores uncompressed data that is sent to and received from the compressed logical drive. Therefore, when a calling program writes to or reads from the compressed logical drive, the operating system accesses the memory cache. When a calling program requests a write to the compressed logical drive, the operating system stores the data into the memory cache and returns control to the calling program. The operating system, at a later time, can compress the data and store the compressed data onto the compressed logical drive. Moreover, if the data is rewritten before being compressed, the operating system avoids unnecessary compression. Similarly, when a calling program requests a read from the compressed logical drive, the operating system checks the memory cache to determine whether the memory cache contains the requested data. If the memory cache contains the requested data, the operating system returns the data to the calling program and thus avoids having to decompress the data.

Figure 1:
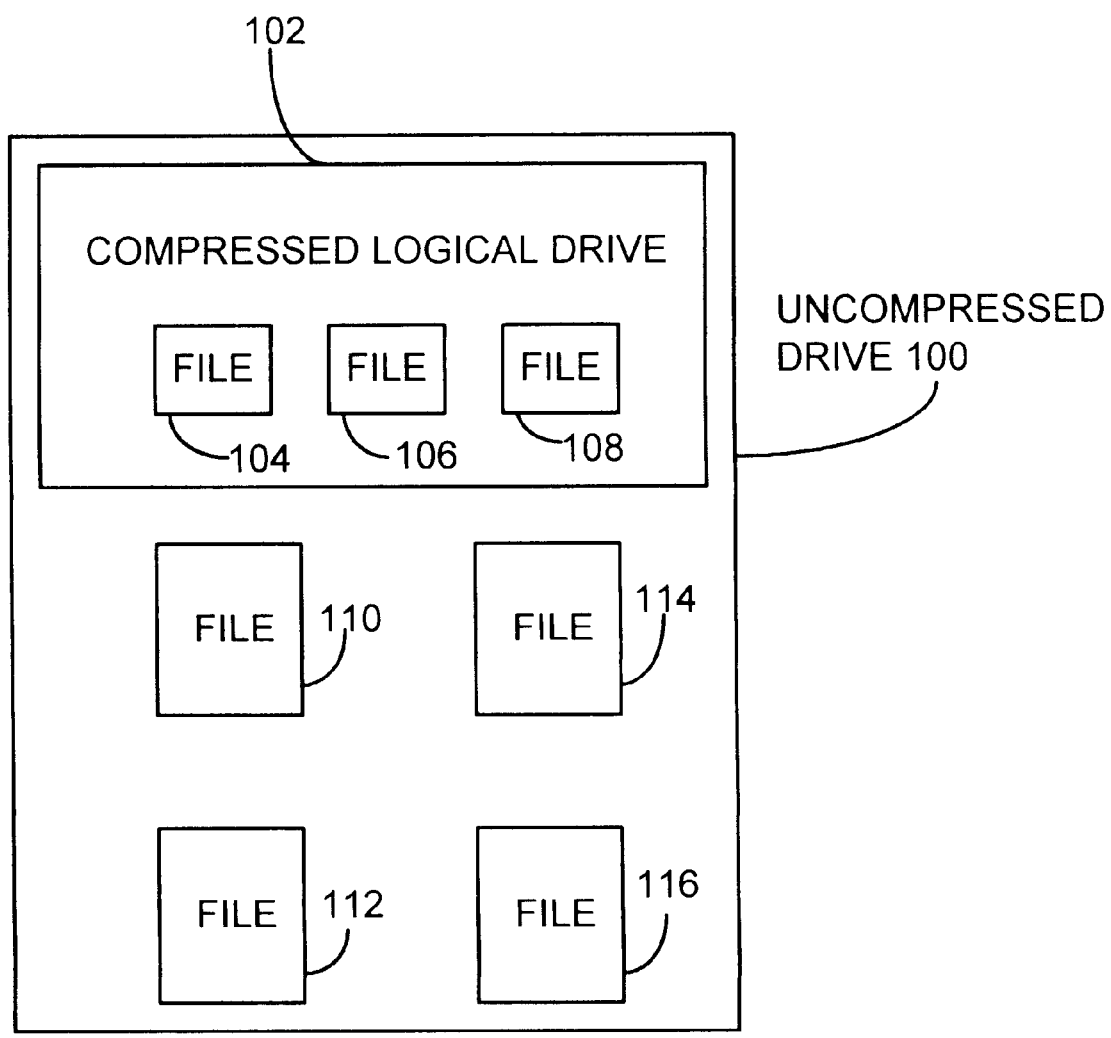
FIG. 1 depicts a prior compressed file system.
Figure 2:
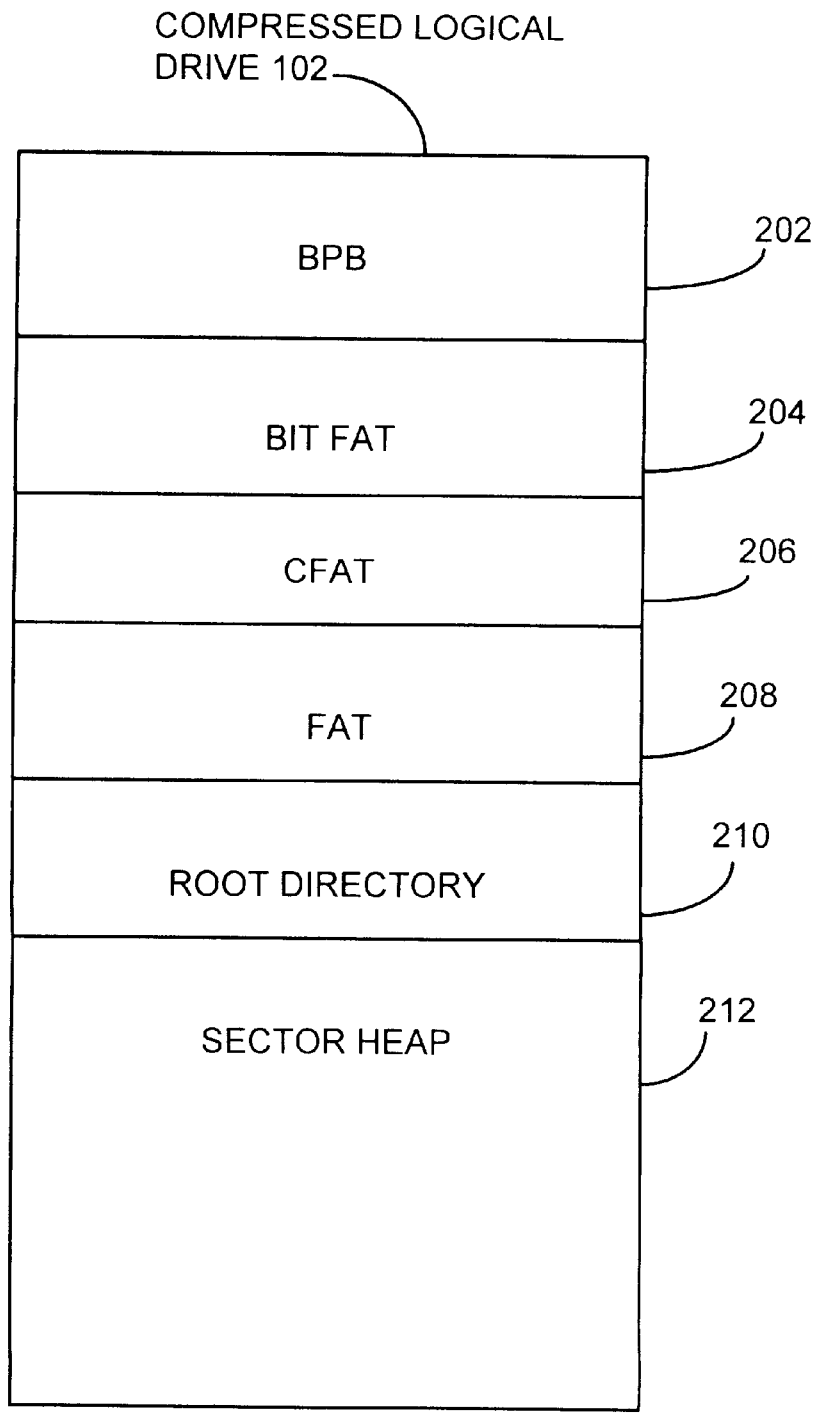
FIG. 2 depicts the structure of a compressed logical drive within a prior compressed file system.
Figure 3:
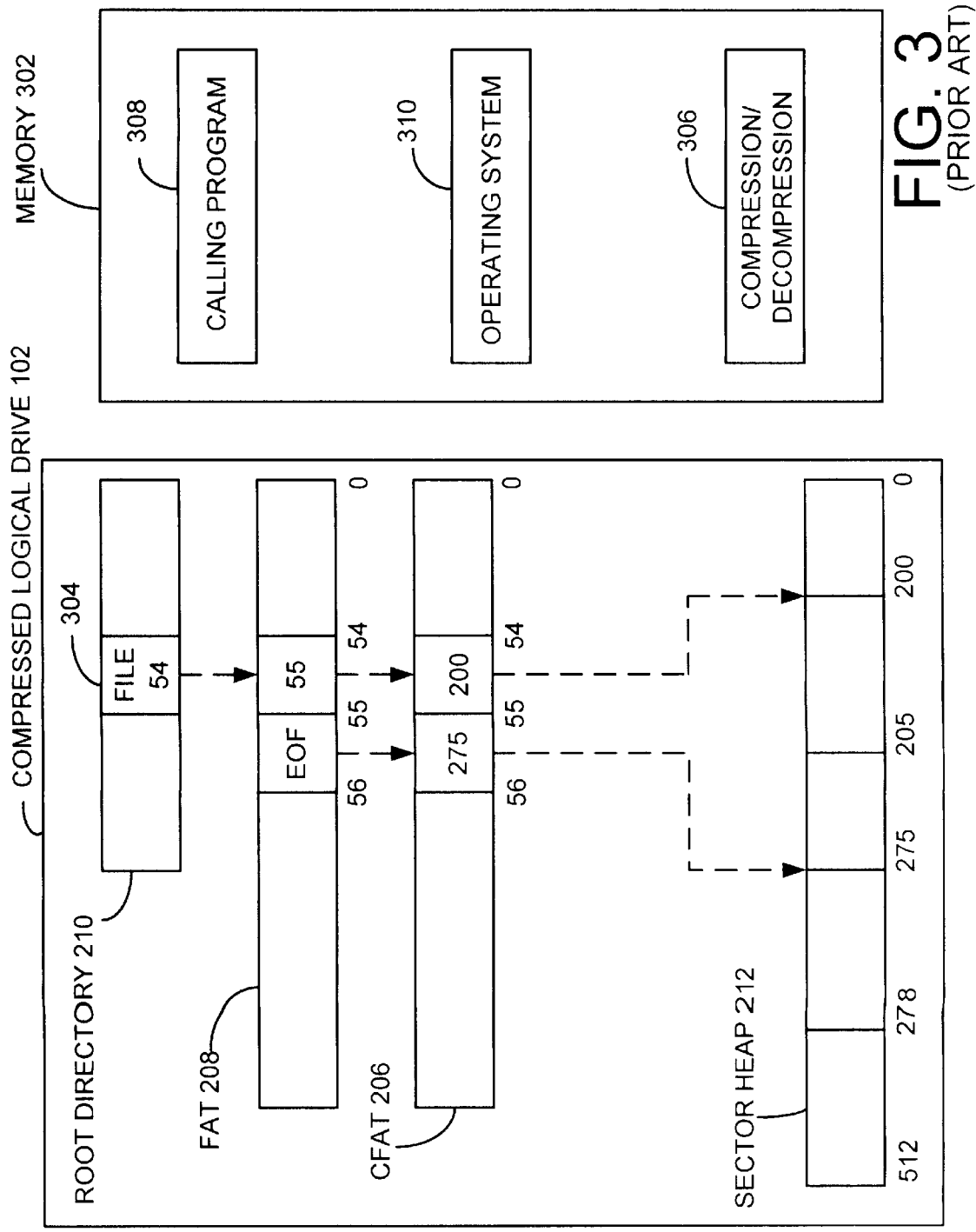
FIG. 3 is a more detailed block diagram of a prior compressed file system.
Figure 4:
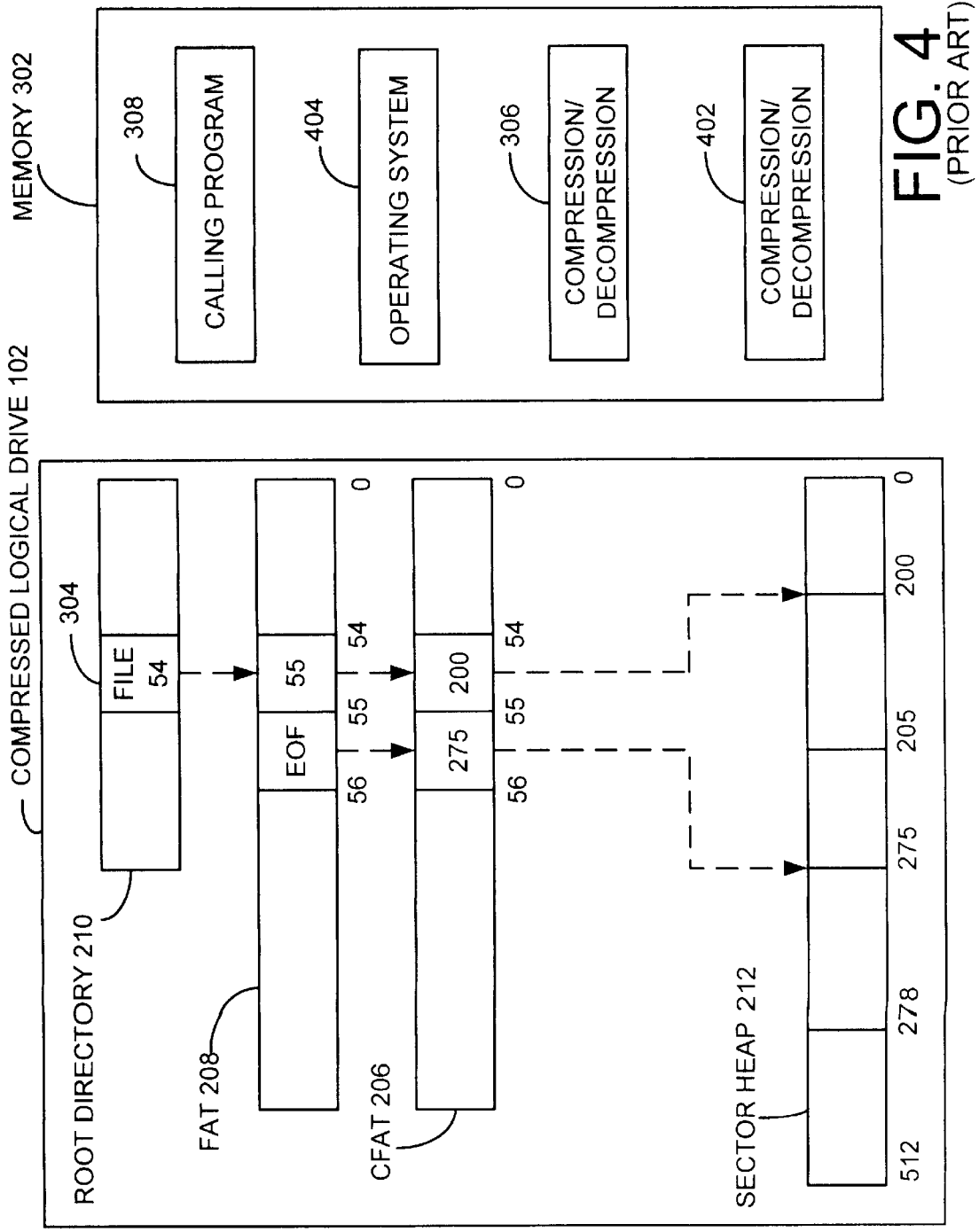
FIG. 4 is a block diagram of a prior compressed file system using a memory cache.
Figure 5:
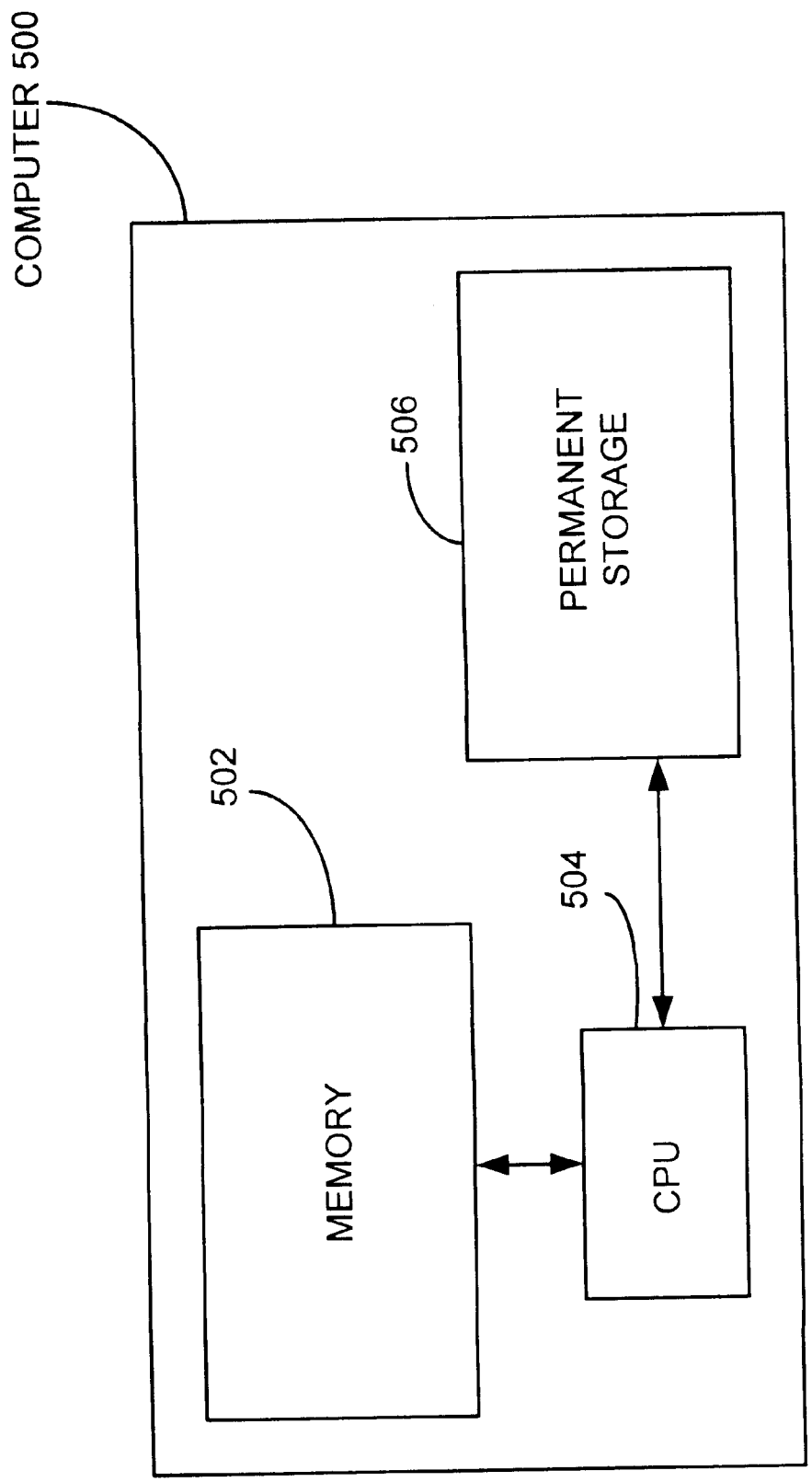
FIG. 5 is a block diagram of a computer suitable for practicing the preferred embodiment of the present invention.

FIG. 5 depicts a block diagram of a computer suitable for practicing a preferred embodiment of the present invention. The computer 500 has a memory 502, a central processing unit (CPU) 504, and a permanent storage 506. Although the preferred embodiment of the present invention is described as operating on permanent storage that is contained within a computer system, one skilled in the art will recognize that the preferred embodiment can be used on permanent storage that is not within a computer system. In addition, although the preferred embodiment is described as operating within a computer system, one skilled in the art will recognize that the present invention can be used with other devices having a permanent storage. Also, the present invention may be implemented as an installable portion of an operating system or implemented independently of an operating system. For example, an application program could implement the caching techniques of the present invention.

Figure 6:
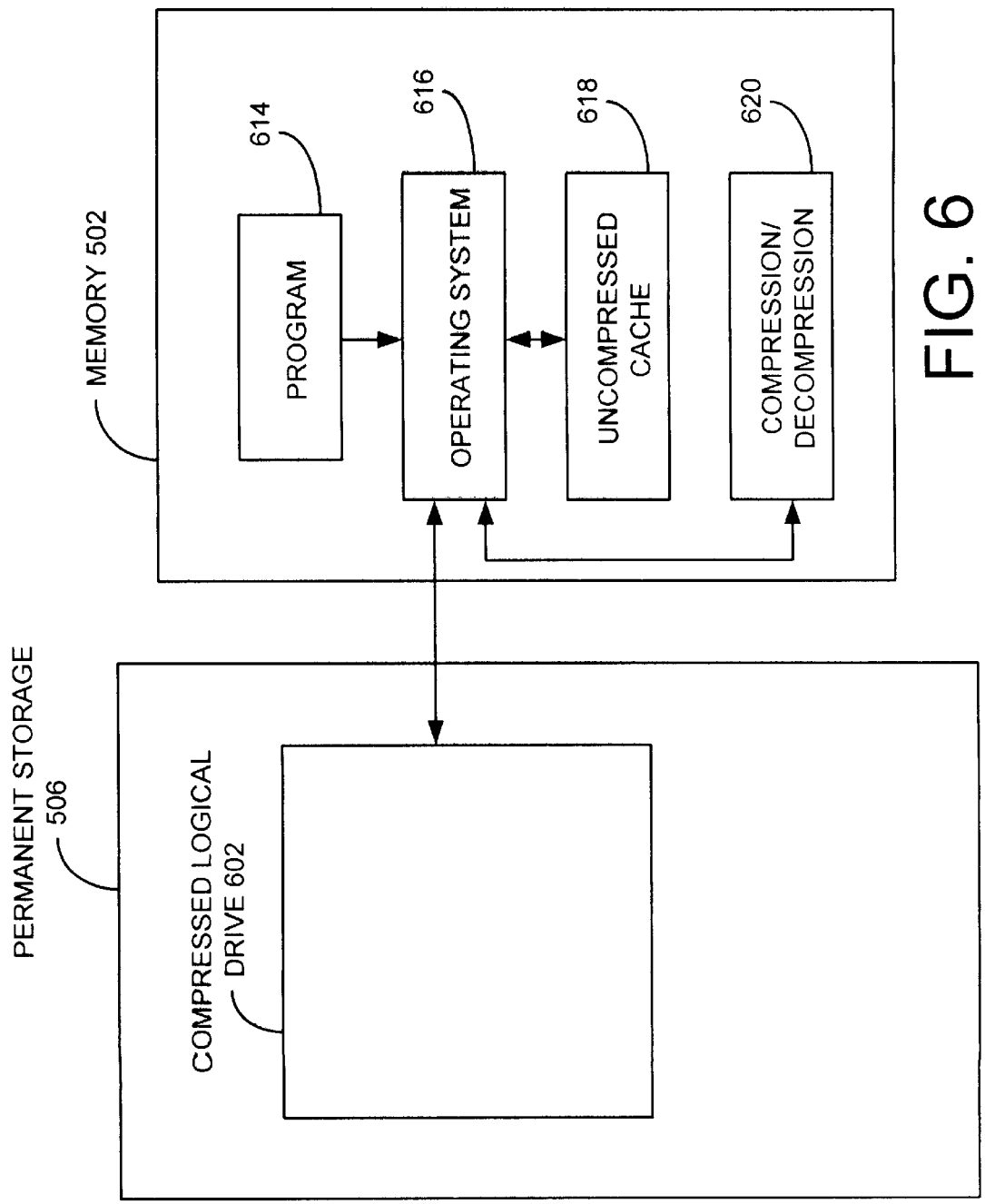
FIG. 6 is a more detailed block diagram of a computer suitable for practicing the preferred embodiment of the present invention.

FIG. 6 is a more detailed block diagram of the permanent storage and the memory of a computer suitable for practicing the preferred embodiment of the present invention. The permanent storage 506 contains a compressed logical drive 602. The memory 502 contains a calling program 614, an operating system 616, a memory cache 618, and a compression/decompression component 620. The calling program 614 invokes the operating system 616 in order to create, open, read, write, and otherwise manipulate files. The memory cache 618 is used for storing uncompressed data that is sent to or received from the compressed logical drive 602. The compression/decompression component 620 is responsible for compressing data that is to be stored on the compressed logical drive 602 and for uncompressing data that is read from the compressed logical drive 602.

In the preferred embodiment of the present invention, a calling program 614 uses the operating system 616 for the creation, deletion, and manipulation of the files in the compressed file system. For example, when the calling program 614 wishes to read a portion of a file, the calling program 614 invokes the operating system 616 to read the file. The operating system 616 first checks the memory cache 618 to determine if the data requested by the calling program 614 is stored in the memory cache 618. If the appropriate data is stored in the memory cache 618, the operating system 616 returns the data to the calling program 614. However, if the memory cache 618 does not contain the appropriate data, the operating system 616 obtains the appropriate data from the compressed logical drive 602 as discussed in the background section. After the operating system 616 receives the data from the compressed logical drive 102, the operating system 616 decompresses the data using the compression/decompression component 620. After the data has been decompressed using the compression/decompression component 620, the operating system 616 returns the data to the calling program 614. The calling program 614 may then use the read data for processing. The operating system 616 may also store the decompressed data in the memory cache 618 depending on the particular caching algorithm used.

Figure 7:
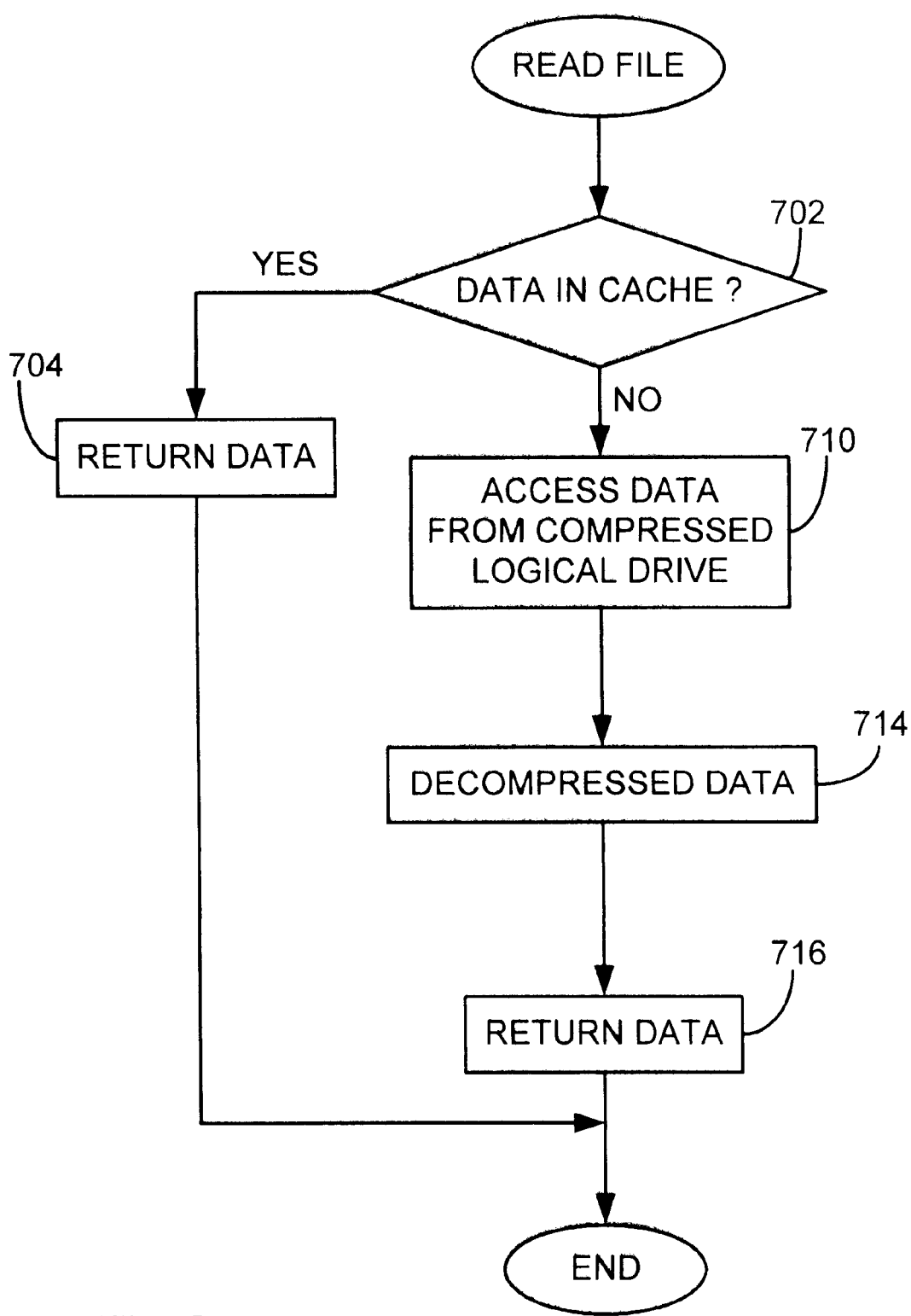
FIG. 7 is a flow chart of the steps performed by the preferred embodiment of the present invention when reading data from a compressed logical drive.

FIG. 7 is a flow chart of the steps performed by the operating system for reading a file. In step 702, the operating system determines whether the requested data is stored in the memory cache. In step 704, if the requested data is stored in the memory cache, the operating system returns the requested data to the calling program. In step 710, if the requested data is not in the memory cache the operating system accesses the requested data from the compressed logical drive. In step 714, the operating system invokes the compression/decompression component to decompress the requested data and, in step 716, returns the requested data to the calling program. After the requested data has been returned to the calling program, depending on the caching algorithm used, the operating system may store the uncompressed data into the memory cache for later use. For example, if the caching algorithm is a "most recently used" algorithm, the operating system stores all data read from the compressed logical drive into the memory cache. However, other caching algorithms may not store the read data into the memory cache.

When a calling program requests the operating system to write data to the compressed file system, the operating system must overcome a significant problem. That is, when the physical free space of the compressed logical drive becomes nearly full, writes to the memory cache may occur that ultimately may fail when the cached data is actually written to the compressed logical drive. In this case, the calling program would continue to execute as if the write were successful, when in actuality, the write was eventually unsuccessful. If a write to the memory cache returns successfully when the write to the compressed logical drive actually fails, this may lead to the loss of data and the calling program may execute in an undesirable (i.e., unexpected) manner. The preferred embodiment of the present invention solves this problem by providing two types of caching: write-behind and write-through. Write-behind caching takes full advantage of the memory cache by writing to the memory cache and immediately returning successfully. The write to the compressed logical disk takes place later. Write-behind caching significantly improves performance for writes in a compressed file system because the calling program does not have to wait for compression or the actual write to the compressed logical drive to complete. Write-through caching, on the other hand, provides for actually writing the data to the compressed logical drive before returning to the calling program. Therefore, if the write fails in write-through caching, the write failure is immediately reported to the calling program so that the calling program can take appropriate action. A preferred embodiment of the present invention provides write-behind caching while the write to the memory cache is ensured to succeed with respect to the amount of space sufficient for storing the write request when actually written to the compressed logical drive. When the success of the write to the compressed logical drive can no longer be ensured because of insufficient space on the compressed logical drive, the preferred embodiment of the present invention switches to write-through caching. Therefore, the preferred embodiment of the present invention takes advantage of the reduced overhead due to using a memory cache for uncompressed data, but also provides the safety of a write-through caching file system when circumstances dictate.

Figure 8:
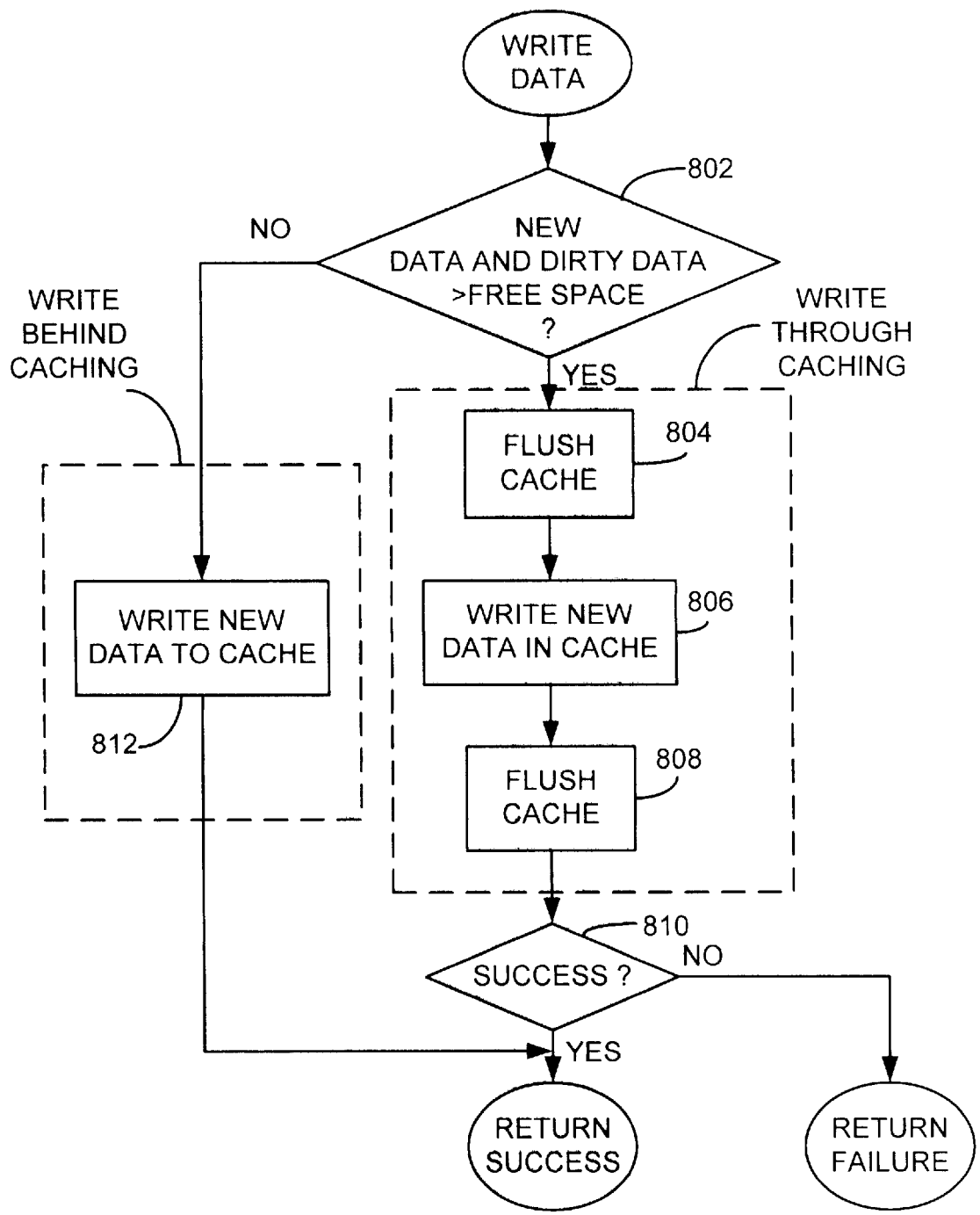
FIG. 8 is a high-level flow chart of the steps performed by the preferred embodiment of the present invention for writing data to a compressed logical drive.

FIG. 8 is a high level flow chart of the steps performed by the operating system of the preferred embodiment of the present invention when requested to write new data to the compressed file system. The thrust of the steps performed by the operating system is that when writing the new data to the compressed file system, the operating system performs write-behind caching (as indicated by step 812) when the writing of the new data can be ensured to succeed with respect to the amount of free space on the compressed logical drive. Otherwise, when the writing of the new data cannot be ensured to succeed, the operating system performs write-through caching (as indicated by steps 804–808). In step 802, the operating system determines if the amount of new data plus the dirty data in the memory cache is greater than the amount of free space on the compressed logical drive. "Dirty" data in the memory cache refers to data in the memory cache that has been modified since the last write to the compressed logical drive. If there is sufficient free space, in step 812, the operating system writes the new data to the memory cache, thereby performing write-behind caching. After performing write-behind caching, the operating system returns success to the calling program. If, however, there is insufficient free space on the compressed logical drive for both the new data and the dirty data to be written, in step 804, the operating system writes the dirty data in the memory cache to the compressed logical drive ("flushes the memory cache"). In step 806, the operating system writes the new data into the memory cache, and in step 808, the operating system flushes the memory cache, thereby performing write through caching. After performing write-through caching, in step 810, the operating system determines if the operation was successful and either returns failure or success to the calling program.

The compressed file system maintains the memory cache so that there is enough free space on the compressed logical drive to store the "dirty" cache blocks. A cache block is "dirty" if changes to the cache block have not yet been written to the compressed logical drive. When a compressed file system uses cache blocks that are the same size as clusters, then the compressed file system ensures that the number of dirty cache blocks is less than or equal to the number of clusters of free space. (A cache block can always be written in uncompressed form to the compressed logical drive and a bit can be set in the corresponding CFAT entry to indicate that the data is uncompressed. In this way, the compression component can ensure the maximum size for the "compressed" data.) When a block of new data is to be written to the compressed logical drive, the compressed file system determines whether there are enough clusters of free space on the compressed logical drive to store the block of new data and the dirty cache blocks. That is, whether the number of clusters of free space is greater than the number of dirty cache blocks that would exist if the new data were written to the memory cache. If the number of free clusters is greater, then there is enough free space to store the dirty cache blocks and the block of new data at least in uncompressed form and the compressed file system writes the block of new data to the memory cache.

If, however, the number of clusters of free space is only equal to the number of dirty cache blocks (the compressed file system ensures that it cannot be less than), then the compressed file system cannot be certain whether there is actually enough free space for the block of new data. If the compression results in a significant reduction in the storage needed to store the dirty cache blocks, then there may actually be enough free space to store the block of new data. On the other hand, if no reduction results, then there will not be enough free space. Consequently, when the number of clusters of free space is equal to the number of dirty cache blocks, then the compressed file system writes the dirty cache blocks to the compressed logical drive and then determines the number of clusters of free space. Alternatively, one skilled in the art would appreciate that an accurate determination as to whether there is enough free space for the block of new data can be made by writing one dirty cache block at a time to the compressed logical drive or by compressing the dirty blocks without writing the compressed data to the compressed logical drive. After the dirty cache blocks are written to the compressed logical drive, the compressed file system determines whether there is at least one cluster of free space. If there is at least one cluster of free space, then the compressed file system writes the block of new data to the memory cache. Otherwise, there still may be enough free space if the block of new data can be compressed significantly. Thus, the compressed file system attempts to physically write the block of new data to the compressed logical drive. The write will fail if there is not enough free space. If the write fails, then the compressed file system returns a disk full error, else the compressed file system writes the block of new data to the memory cache (depending on the caching algorithm).

Figure 9:
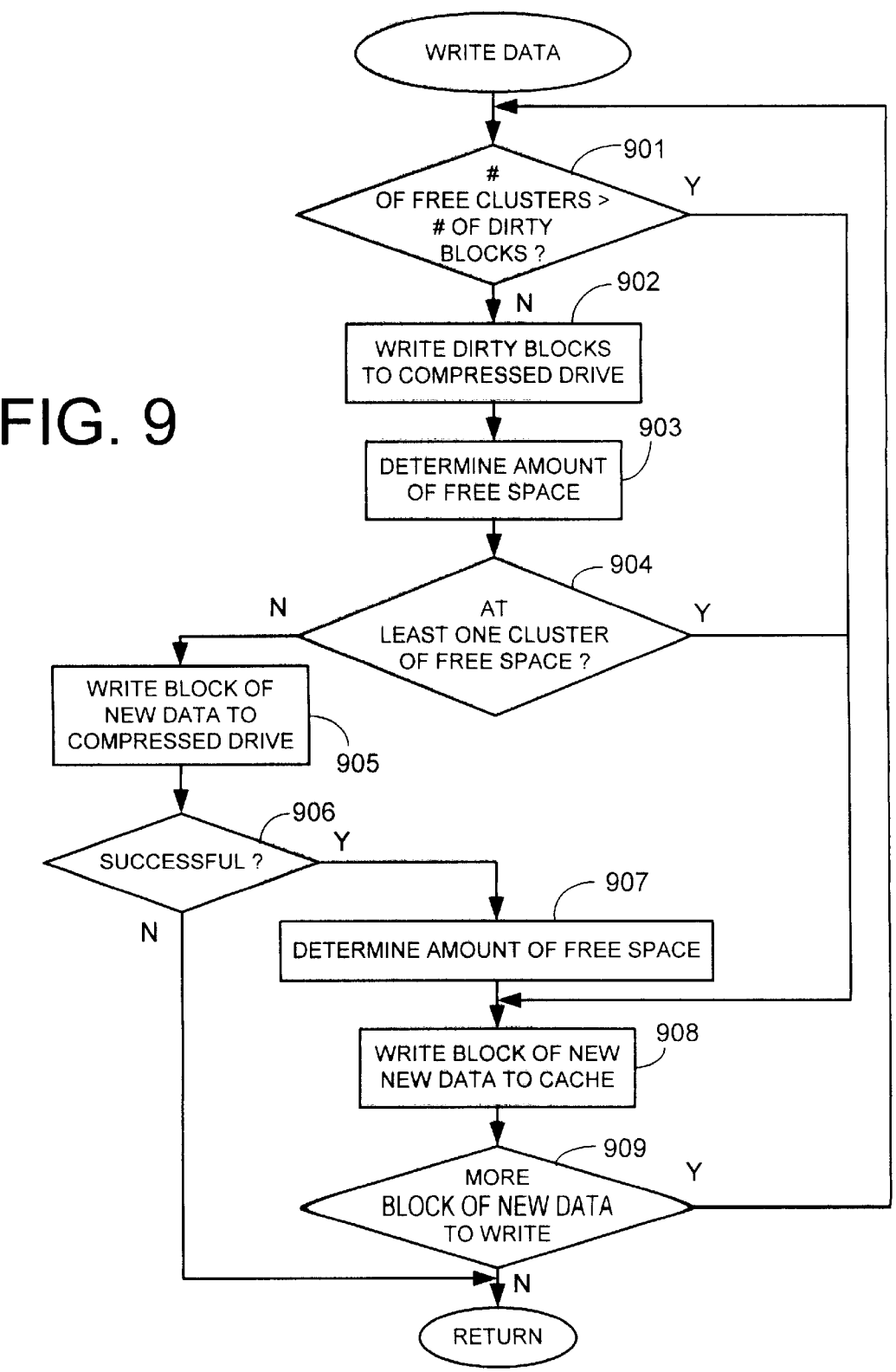
FIG. 9 is a more detailed flow chart of the steps performed by the preferred embodiment of the present invention for writing data to a compressed logical drive.

FIG. 9 is a detailed flow diagram of a function for writing data in a preferred embodiment. The function is passed blocks of new data to write to the compressed logical drive. The function loops through steps 901 and 909 processing each block of new data. In step 901, if the number of clusters of free space is greater than the number of dirty cache blocks in the cache memory, then there is enough free space for the block of new data and the function continues at step 908, else the finction continues at step 902. In steps 902 and 903, the function writes the dirty cache blocks to the compressed logical drive and then determines the amount of free space on the compressed logical drive. In step 904, if there is at least one cluster of free space, then there is enough free space for the block of new data and the function continues at step 908, else the function continues at step 905. In step 905, the function attempts to write the block of new data to the compressed logical drive. In step 906, if the write was successful, then the function continues at step 907, else the function returns with an error. In step 907, the function determines the amount of free space on the compressed logical drive. In step 908, the function writes the block of new data to the memory cache. In step 909, if there are more blocks of new data to write, then the function loops to step 901 to process the next block of new data, else the function returns.

Although an embodiment of the present invention has been described as using a cache block size which is equal to the size of a cluster, one skilled in the art will recognize that the present invention can be used with a cache block size which is less than or greater than the size of a cluster. When the cache block size is less than the size of cluster, the compressed file system ensures that at least one cluster of free space is available for each dirty cache block. Even though cache block size is less than one cluster, the compressed file system compresses and writes only entire clusters. When the cache block size is greater than the size of a cluster, then the compressed file system ensures that the appropriate integral number of clusters of free space are available to store cache blocks in uncompressed form. In addition, although the preferred embodiment of the present invention has been described where all cache blocks to be written are cluster aligned, one skilled in the art will recognize that the present invention can be used with cache blocks that are not cluster aligned. When the cache blocks are not cluster aligned, the compressed file system ensures that as many clusters of free space are available as is spanned by the cache blocks. Also, one skilled in the art would appreciate that the present invention can be used in conjunction with file systems that use units of allocation other than clusters. In general, such file systems need to ensure that there is sufficient free space available on a drive to store that data that is cached.

While the present invention has been described with reference to a preferred embodiment thereof, those skilled in the art will know of various changes in form that may be made without departing from the spirit and scope of the claimed invention as defined in the appended claims.

What is claimed is:

1. A method in a computer system for writing data, the computer system having a compressed drive and a cache, the method comprising the steps of:

when the compressed drive has sufficient space to store the data, storing the data in the cache in an uncompressed form so that the data can be later compressed and written to the compressed drive; and when the compressed drive has insufficient space to store the data, compressing the data; and writing the compressed data to the compressed drive.

2. A computer-readable medium whose contents cause a computer system having a compressed storage device and a cache to write data to the compressed storage device by:

when the compressed drive has sufficient space to store the data, storing the data in the cache in an uncompressed form so that the data can be later compressed and written to the compressed drive; and when the compressed drive has insufficient space to store the data, compressing the data; and writing the compressed data to the compressed drive.

3. A method in a computer system having an operating system for storing data on a drive, comprising:

receiving in the operating system from a program a write command specifying data to be written to a drive, the drive being designated to store data in a compressed form; and in response to receiving the write command, storing the data specified by the write command in a cache in an uncompressed form.

4. The method of claim 3, further comprising:

after storing the data in the cache in an uncompressed form, determining to flush to the drive the data stored in the cache;

in response to determining to flush to the drive the data stored in the cache, compressing the data stored in the cache; and storing the compressed data on the drive.

5. A computer-readable medium whose contents cause a computer system to store data on a storage device, by:

receiving a write command specifying data to be written to a selected storage device, the selected storage device being designated to store data in a compressed form; and in response to receiving the write command, storing the data specified by the write command in a cache in an uncompressed form.

6. The computer-readable medium of claim 5 wherein the contents of the computer-readable medium further cause the computer system to perform the steps of:

after storing the data in the cache in an uncompressed form, determining to flush to the storage device the data stored in the cache;

in response to determining to flush to the storage device the data stored in the cache, compressing the data stored in the cache; and storing the compressed data in the storage device.

7. A computer memory containing a cache data structure for a compressed drive, the data structure comprising data specified in a command received from a program to write the data to the compressed drive, the data in the data structure being in an uncompressed form, such that the data contained in the data structure need not be compressed before the data is stored in the data structure, and such that compression of the data contained in the data structure can be deferred until the data is written to the compressed drive.

8. A caching device for a storage device, the storage device storing data in a compressed form, comprising:

a processor for executing a program containing a command to write specified data to the storage device; and a cache for storing the specified data in an uncompressed form in response to execution of the program by the processor.

9. The caching device of claim 8, further comprising:

a compression subsystem that compresses the data stored in the cache for storage on the storage device.

* * * * *